D. K. ALLISON.
PAN SKIPPING DEVICE FOR CRACKER CUTTING MACHINES.
APPLICATION FILED MAY 15, 1919.
1,323,667.
Patented Dec. 2, 1919.
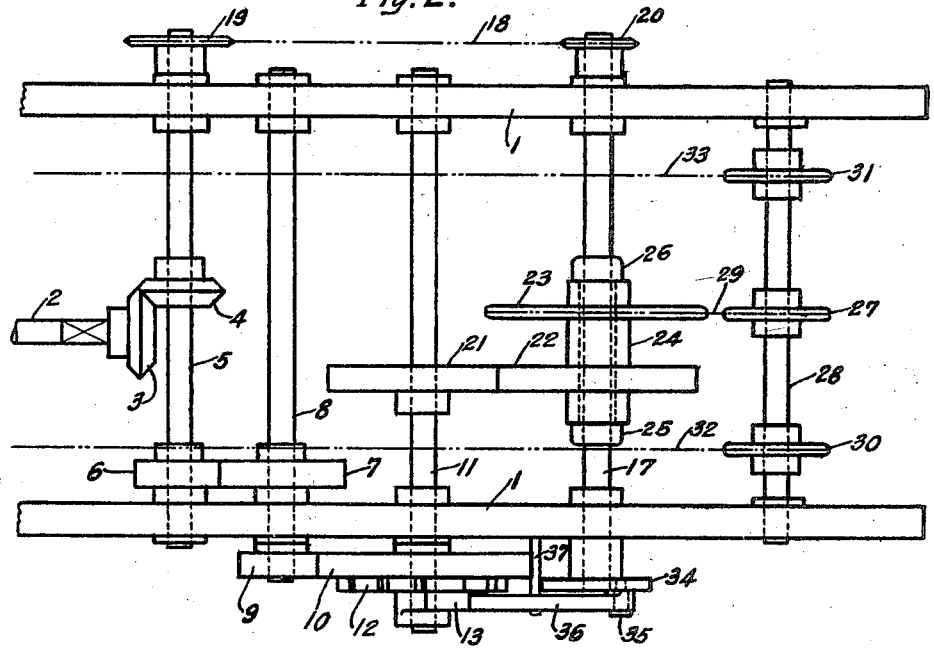
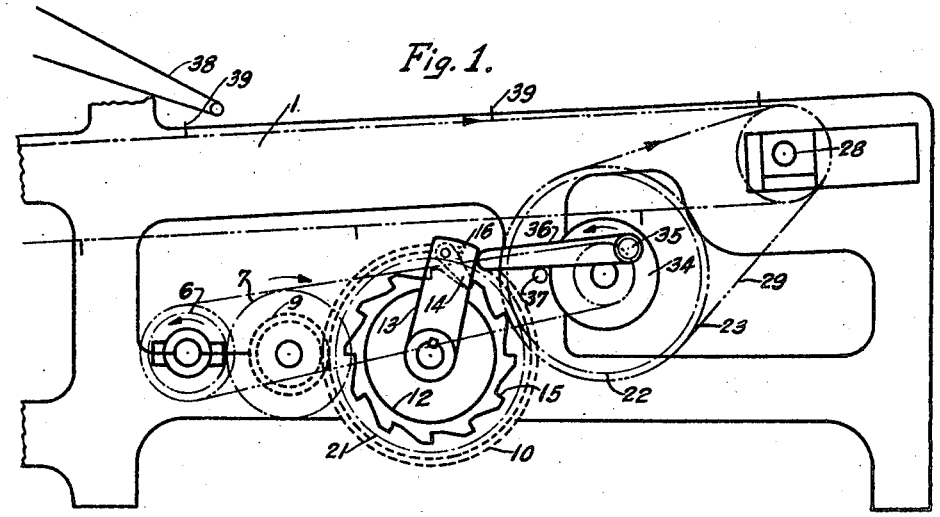
Inventor.
Daniel K. Allison

UNITED STATES PATENT OFFICE.

DANIEL K. ALLISON, OF CINCINNATI, OHIO.

PAN-SKIPPING DEVICE FOR CRACKER-CUTTING MACHINES.

1,323,667. Specification of Letters Patent. Patented Dec. 2, 1919.

Application filed May 15, 1919. Serial No. 297,227.

*To all whom it may concern:*

Be it known that I, DANIEL K. ALLISON, a citizen of the United States, residing in Cincinnati, county of Hamilton, and State of Ohio, have invented a certain new and useful Improvement in Pan-Skipping Devices for Cracker-Cutting Machines, of which the following is a specification.

My invention relates to machines for cutting crackers or biscuits from a sheet of dough and delivering the cut biscuit forms onto pans preparatory to baking and as the pans are usually carried upon conveyer chains or belts in succession through the machine it is the object of my invention to give to the panning chains a periodically accelerated movement as each pan passes a predetermined point to prevent the biscuit forms from being deposited on the edges of the pans or between the pans. I accomplish this object by the mechanism hereinafter described and illustrated in the drawings in which Figure 1 is a side elevation of my invention and Fig. 2 is a plan view of the same parts.

In the drawings 1—1 represent parts of the frames of a cracker cutting machine. 2 is a power transmission shaft extending from the main drive of the machine. The miter-gear 3 is fixed to shaft 2 and drives miter-gear 4 which is fast on shaft 5. Spur gear 6 is fast on shaft 5 and drives gear 7 which is fast on shaft 8. Spur gear 9 also fast on shaft 8 meshes into and drives gear 10 which is loosely mounted on shaft 11. Fastened to gear 10 or preferably integral therewith is the ratchet annulus 12. Adjacent to gear 10 and the ratchet annulus 12 is the arm 13 which is fast on shaft 11. Arm 13 is provided with the pawl 14 which is arranged to engage the teeth 15 of the ratchet annulus. The spring 16 keeps the pawl 14 in engagement with the teeth 15 of the ratchet annulus. Shaft 17 is driven from shaft 5 through the chain 18 and sprocket wheels 19 and 20 both fast on their respective shafts. Gear 21 is fast on shaft 11 and drives gear 22 which is integral with sprocket wheel 23 and sleeve 24. Gear 22, sprocket 23 and sleeves 24 are all loose on shaft 17 and are held in position laterally by the set collars 25 and 26. Sprocket 23 drives sprocket 27 fast on shaft 28 by the chain 29. Sprockets 30 and 31 fast on shaft 28 drive conveyer chains 32 and 33 which serve to carry the pans through the machine.

Fast on shaft 17 is the crank disk 34 carrying the crank pin 35. The pitman 36 is pivotally mounted on crank pin 35 at one end and its free end is supported by the stud 37 which extends from the frame 1. All the shafts heretofore mentioned are rotatably mounted in suitable bearings secured to the frames of the machine.

In the operation of my invention, power is transmitted from the main drive of the machine through the shafts 2, 5 and 8 and gears 3 and 4 and 6 and 7. Pans are placed in succession on the conveyer chains 32 between the lugs 39—39 and as they are carried along cracker or biscuit forms are deposited thereon from a traveling apron 38. The arm 13 serves to drive the conveyer chains 33 through the shaft 11, gears 21 and 22, sprocket wheels 23 and 27 and chain 29 and the said arm 13 is arranged to make one complete rotation to carry the conveyer chains the distance equal to the length of one pan. The arm 13 is driven normally through the major part of each rotation by the ratchet annulus 12 by means of the pawl 14 and when the arm 13 in its circuit reaches the position shown in the drawing the pitman 36 is arranged to contact and drive the arm and advance it the distance of one ratchet tooth. This advancing movement is occasioned by the crank pin 35 traveling at a higher velocity than the arm 13. The advancing movement of the arm 13 occurs but once for each rotation of the arm and serves to transmit to the conveyer chains an accelerated or skip movement which serves to prevent the crackers or biscuits from falling on the edges of the pans or between the pans and thus insures their proper deposit on consecutive pans.

Having thus described my invention, what I claim as new and desire to secure by Letters Patent is:—

1. The combination of a driving gear, a driven gear loosely mounted upon a shaft and carrying a ratchet annulus, an arm secured to said shaft carrying a pawl arranged to engage the said ratchet annulus, a crank disk fixed to a second shaft and driven independently of the said gear drive, and a pitman actuated by said crank disk to periodically advance said arm.

2. The combination, an arm fast on a shaft, a power driven ratchet annulus mounted loosely on said shaft adjacent to said arm, a pawl connection between the ratchet annulus and the arm and a crank actuated pitman arranged to periodically advance said arm.

3. The combination of an arm fixed to a shaft, a power driven ratchet annulus mounted loosely on said shaft adjacent to said arm, ratchet means whereby the ratchet annulus drives the said arm during the major part of each complete rotation thereof and reciprocating means to drive said arm during the remainder of each rotation.

DANIEL K. ALLISON.

Witnesses:
WILLIAM HUST,
WALTER A. RIDD.